Feb. 16, 1926.
M. A. LAABS
1,573,073
LENS PRODUCING APPARATUS
Filed Dec. 15, 1921
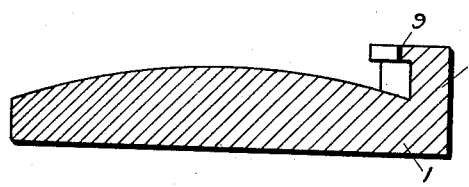
FIG. I
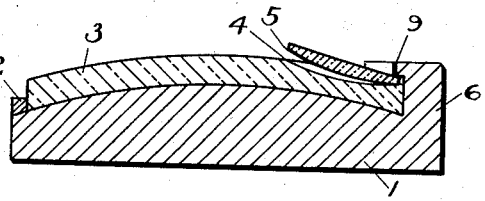
FIG. II
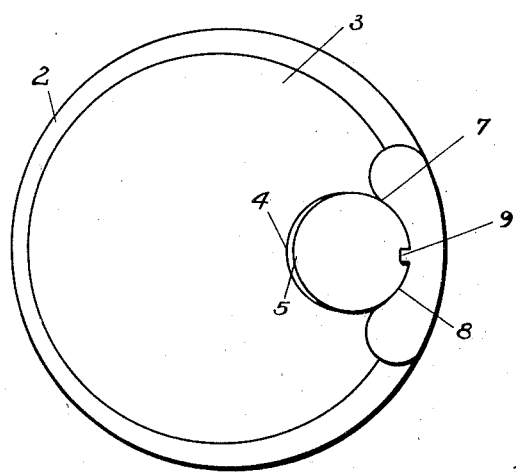
FIG. III
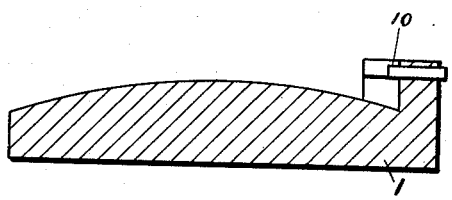
FIG. IV
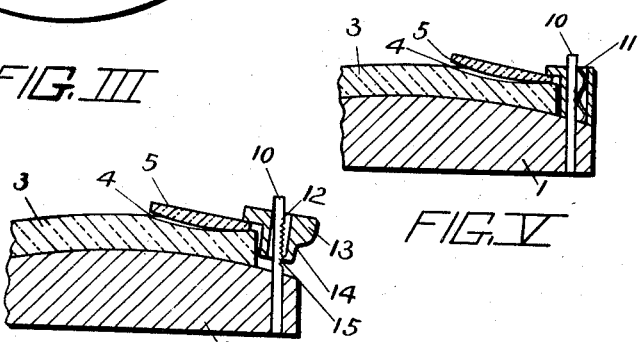
FIG. V
FIG. VI
INVENTOR
MAX A. LAABS
BY
H. H. Styll & A. K. Parsons
ATTORNEYS Patented Feb. 16, 1926.

1,573,073

UNITED STATES PATENT OFFICE.

MAX A. LAABS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-PRODUCING APPARATUS.

Application filed December 15, 1921. Serial No. 522,671.

*To all whom it may concern:*

Be it known that I, MAX A. LAABS, a citizen of the United States, residing at Southbridge, in the county of Worcester and State of Massachusetts, have invented certain new and useful Improvements in Lens-Producing Apparatus, of which the following is a specification.

This invention relates to improvements in lens producing apparatus and has particular reference to a novel and improved structure particularly designed for use in the production of fused bifocal lenses.

One of the principal objects of the present invention is the provision of an improved and simplified construction for use in holding the two parts of a fused bifocal lens prior to and during the fusing operation, which shall satisfactorily retain the parts in correct relationship one to the other without the necessity of employment of separating wedges or of glue or other adhesive media.

A further object of the present invention is the provision of a simple and improved device which shall be practically indestructible in form and of a nature to satisfactorily stand the heat of the furnaces as required for fusion without appreciable deterioration.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of the invention.

Figure I represents a side elevation of one embodiment of my improvement.

Figure II represents a longitudinal sectional view therethrough with the lens parts in position.

Figure III represents a plan view.

Figure IV represents a fragmentary sectional view illustrating a slight modification.

Figure V is a similar view illustrating another form of the construction.

Figure VI is a corresponding view of another embodiment thereof.

In the drawings, the numeral 1 designates the main bed or base block preferably provided with a rim 2 and serving to support the major lens blank 3. This blank 3 is ordinarily formed with the countersink or recess 4 adapted to have fused thereinto the segment 5 of a different index of refraction to provide the so termed kryptok or fused bifocal formed from glass having two different indices of refraction.

Prior to my invention the customary method of producing these lenses has been to hold them spaced at one edge by means of an interposed wedge member, it being necessary in the fusion of the parts that the surfaces gradually approach each other and are so spaced that all air bubbles be progressively forced out since the inclusion of any air bubbles within the fused surface is detrimental to the final product. This employment of a wedge has necessitated the use of adhesive in properly retaining the wedge in position and in addition the employment of adhesively retained lateral clips to prevent slipping of the segment while being handled or in the furnace during the fusing operation.

The present invention, however, obviates all of these difficulties in that I provide at one edge of the base member 1 the support 6 having the inwardly extending portion 7 overhanging or overlying the lens blank 3 and with an arcuate face 8 to receive and steady the segment 5. This member 7 in addition to having the arcuate portion 8 has centrally thereof the inwardly projecting tongue or lip 9 adapted to bear on the upper face of the segment and hold it in tilted relation to the countersink, as will be best understood by reference to Figure II where the parts are shown in position prior to the fusion. It will be understood that the height of the lip 9 is sufficient so that the main blank 3 may be put in position and the segment slid in slightly tilted relation under the lip 9 in the event that a one-piece style of construction such as shown in Figures II and IV is employed. The only difference in Figure IV is that in place of an integral lip 9 formed from composition material, such as the base 1, I make use of the metal pins 10.

Figures V and VI illustrate a modified form of the invention in which the portion 7—8—9 in place of being integral with the base 1 is separate therefrom and is slidably mounted on suitable vertical guide pins 10 in which event the member 7 can be slid upwardly initially until the lens parts are placed in position and then brought down until it bears on the edge of the segment sufficiently to tilt the same as shown in Figures V and VI when the weight of the device itself will hold the parts in place. This may be supplemented by the use of a spring 11 as shown in Figure V. If desired to dispense entirely with the use of springs the post 10 may or may not be roughened or serrated as indicated at 12, while the member 7 has an outwardly extending heavier portion 13 and a depending sleeve or barrel portion 14 sliding on the post 10, this being provided with the dog or engaging flange 15 at the lower end. This form is particularly advantageous in that the weight of the part 13 is sufficient to tend to swing down that side and cause the sleeve or barrel portion 14 to frictionally bind on the post 10, the member being moved downward until it tightly and properly engages the segment 5 and holds it in proper relation, when by this tilting action and interlocking of the part 15 and adjacent serrations 12 the member will be prevented from either upward loosening movement allowing the segment to come into improper contact with the lens and also will cause the member to stick and have but slight if any tendency to move downward so that undue pressure on the upper surface of the segment tending to produce distortion effects in the finished lens is eliminated.

I claim:

1. A device of the character described comprising a base portion, a post rising from the base portion, a head slidable and tiltable on the post having an inner bifocal segment engaging and positioning member and an outer weighted operating portion for controlling the position of the member on the supporting post.

2. A device of the character described comprising a base portion, a post rising from the base portion, a head slidable and tiltable on the post having an inner bifocal segment engaging and positioning member and an outer weighted operating portion for controlling the position of the member on the supporting post, said post having a roughened or serrated portion for engagement by the sliding head.

3. A device of the character described, comprising a base portion, a post rising from the base portion, a head slidable and tiltable on the post having an inner bifocal segment engaging and positioning member and an outer weighted operating portion for controlling the position of the member on the supporting post, said head having means for interlocking engagement with the post to secure the parts in adjusted position.

In testimony whereof I have affixed my signature.

MAX A. LAABS.